March 2, 1965 W. HOLZER 3,171,987
IMPULSE DEVICE FOR THE PROGRAM CONTROL OF WASHING MACHINES
Filed March 16, 1960 2 Sheets-Sheet 1

INVENTOR
WALTER HOLZER

By Toulmin & Toulmin

Attorneys

March 2, 1965  W. HOLZER  3,171,987
IMPULSE DEVICE FOR THE PROGRAM CONTROL OF WASHING MACHINES
Filed March 16, 1960  2 Sheets-Sheet 2
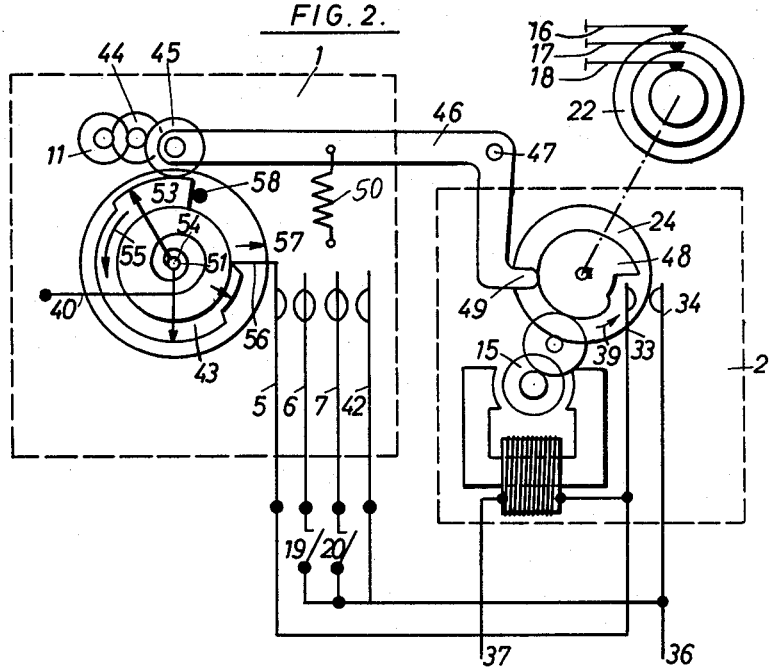
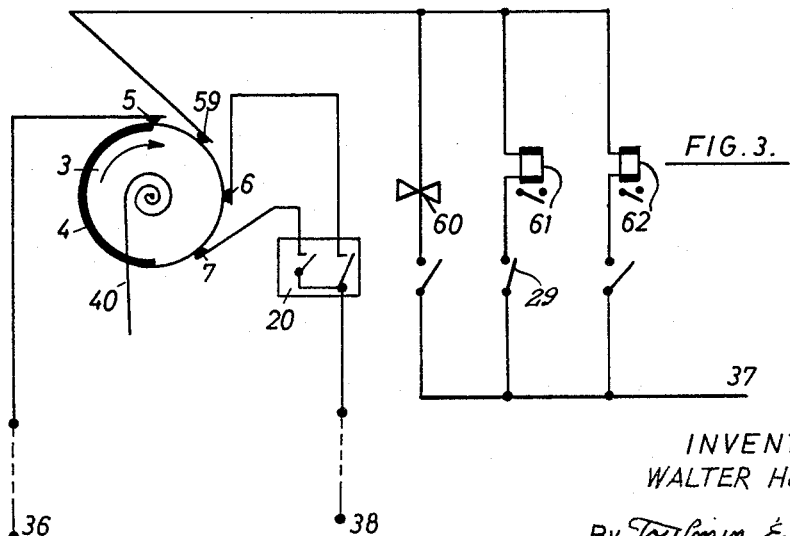
INVENTOR:
WALTER HOLZER
By Toulmin & Toulmin
Attorneys United States Patent Office 3,171,987
Patented Mar. 2, 1965

3,171,987
IMPULSE DEVICE FOR THE PROGRAM CONTROL
OF WASHING MACHINES
Walter Holzer, Schutzenrain, Meersburg
(Bodensee), Germany
Filed Mar. 16, 1960, Ser. No. 15,387
Claims priority, application Germany, Mar. 19, 1959,
H 35,915; June 15, 1959, H 36,664, H 36,666
3 Claims. (Cl. 307—141)

The present invention relates to a timed step switching device for washing machine controls. It is the further object of this invention to provide short and long switching times in a program cycle. A further object of this invention is to change the program without altering the control itself, by changing the impulse times. It should also be possible to change whole sections of the control program by a corresponding pre-selection. It is important that a precise program control be available that fits all kinds of washing programs and that this be accomplished within the lowest production costs and with the least waste of space. It must be reliable and work faultlessly despite strong shocks, voltage oscillation, and dampness. These conditions are especially important for the use of controls in dish-washing and in washing machines.

There are impulse devices already in use, which operate the stepping of the program contacts using various long time pulses which step the program contacts strictly mechanically at predeterimned times. The disadvantage of this arrangement is that it is very difficult to accomodate the control apparatus when switching from long to short and from short to long program times. It is also difficult to set a program pre-selection by changing the program times in the said arrangements. These options are quite desirable, when one has to wash different kinds of clothes, each requiring different treatment.

It is the primary object of this invention to avoid these disadvantages and to construct a pulse device in such a way that it is possible to switch the program contacts exactly in a preselected sequence, according to a pre-selected program. It is also possible to have the selection of further program sections take place easily, e.g. by pressing buttons.

The primary feature of this invention resides in a pulse device which assigns various periods of times to various program sections of a program control system.

It is a further object of this invention to provide short and long switching times in a program cycle.

A further object of this invention is to provide for a change of the program without altering the control circuit network itself, by changing the pulse duration times or periods. It is also possible to change complete sections of the control program by a corresponding pre-selection.

The object of this invention is achieved in the following manner. A times pulse device, at the end of any pre-selected switching duration thereof starts the drive motor (stepping motor) for the program contacts; after this drive motor has been started, its current supply is derived via a network which will stop the motor after completion of a step. In the meantime the pulse device is forced by a spring to its starting position, independent from the stopping of the drive motor for the program motor.

The cooperation of timed pulse devices or timers with a motor connected in an automatic cut-out or self interrupting circuit and which steps the program contacts has various advantages. The timed pulse device, which returns to its initial position after every step permits both short or long switching pulses of precise duration depending only upon the length of the path through which the pulse device is running. The automatic cut-out used to run the motor for the program contacts, has the advantage that the switching always takes place from a definite initial position. It is also important that both the pulse device, giving timed pulses, as well as the driving of the program contacts do not require the expenditure regarding precision, as the known arrangements.

In the usual and known arrangements, cam discs provide for a continuous train of time pulses and a stepping mechanism operates the program contacts. Subsequently, in these devices the pulse device and the automatic cut-out and the motor are returned together to their initial positions. In that way eventual errors accumulate. In the device according to the invention, eventual errors occur only in a small area, and the constant return to the initial position obviates their accumulation.

While the specification concludes with claims particularly pointing out and distinctly claiming the subject matter which is regarded as the invention, it is believed that the invention, the objects of the invention and further objects and advantages thereof will be better understood from the following description taken in connection with the accompanying drawing in which:

FIG. 2 illustrates a circuit diagram of a second embodiment of the invention in which a timed pulse device is actuated for its return to its initial position by mechanical means; and FIG. 3 illustrates a modification and improvement of the device shown in FIG. 1.

Figure 1:
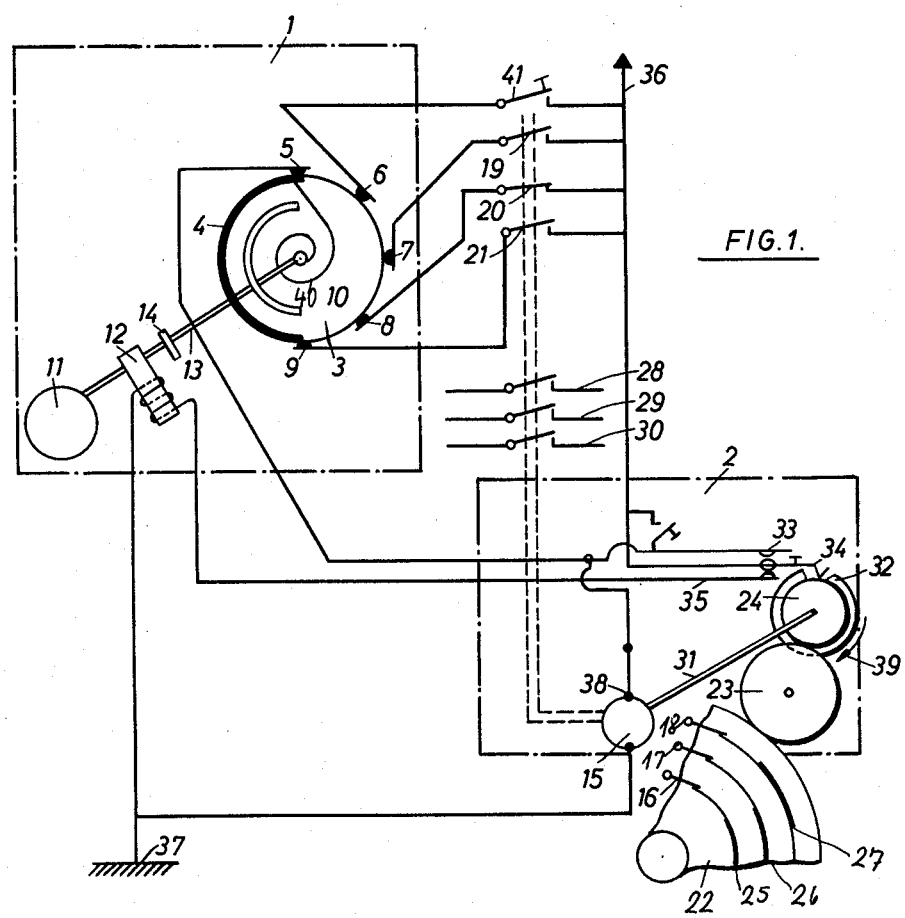
FIG. 1 illustrates a circuit diagram of a first embodiment of the invention in which there is a timer or timed pulse device connected electrically to a step switching device for returning the timer to its initial position.

Turning now to the detailed description of the drawing, in FIG. 1 there is a timer or timed pulse device 1 blocked out by a dash-dot contour line. A motor with automatic cut-out circuit network for stepwise actuating program contacts is denoted with reference numeral 2 and is also blocked out by a dash-dot line. The arrangements designated in the following as pulse device 1 and automatic cut-out 2 are connected either mechanically or electrically, but they are independent of one another insofar as each of the arrangements returns to its initial position independent from the other, as will be explained below. The drawing illustrates the initial or starting position of the several elements.

The example of impulse device 1 shown in the drawing consists of a disc 3 carrying a circumferentially disposed contact segment 4. Stationary sliding contacts 5, 6, 7, 8, 9 are arranged along the circumference of disc 3 at spatial intervals that can be adjusted. When disc 3 and its conducting contacts segment 4 moves in the direction indicated by arrow 10, contact is made with those of sliding contacts 5–9 then touching contact segment 4.

Disc 3 is driven by motor 11 over a coupling 12 and a shaft 13. In the embodiment illustrated, coupling 12 is an electro-magnetic coupling. Shaft 13 furthermore has a friction coupling 14 disposed between coupling 12 and disc 3.

The automatic cut-out 2 first includes an electric motor 15 serving for stepwise moving a switching program disc 22. Switching disc 22 operates program contacts 16, 17, 18 for the washing machine itself, over trip cams 25, 26 and 27. Switching disc 22 operates auxiliary program contacts such as 19, 20, 21 and 28 and 29 and 30 which are shown. Still other program contacts can be operated by disc 22.

A motor 15 drives the switching disc over shaft 31 and a few intermediate gearing wheels 23 and 24. A trip cam 32 is seated on shaft 31 and operates a contact or interrupter system 34, 35, 33. One terminal of motor 15 is connected to a terminal 37, for example at ground potential. The other terminal of motor 15 denoted with reference numeral 38 is connected to a terminal 36 of a voltage potential provided for running the motor. If the pulse device interconnects terminal 38 and terminal 36 through one of its contacts 6 to 9, motor 15 starts to run. Subsequently, a trip cam 32 rotates in the direction indicated by arrow 39, and closes contacts 33 and 34. In that way terminal 38 is directly connected to terminal 36. Motor 15 continues to rotate trip cam 32 until it has returned to its initial position as indicated, and contacts 33, 34 break the motor circuit. During one revolution of cam 32 switching disc 22 was moved one step further.

Motor 11 of pulse device 1 is preferably a constant speed motor and is always connected to a voltage supply source which can be the same as the operating voltage for motor 15. Electro-magnetic coupling 12 drivingly connects discs 3 and motor 11 when contacts 34, 35 are closed. When electro-magnetic coupling 12 is de-energized, it breaks the power transmission between motor 11 and disc 3 and a spiral spring 40 returns disc 3 from its momentary position back into the initial position illustrated.

To use couplings and a continuously running motor is practical so that the starting times can be free of inertia moments of the motor, which inertia moments might disturb the precision of the motor action in certain cases.

The system operates in the following manner: switching disc 22 closes program contact 20, which corresponds to a pre-selection of sliding contact 8; thus, a particular time interval for the switching action produced by switching disc is preselected thereby.

Switching disc 22 remains in the switching position it has until contact segment 4 reaches sliding contact 8. In that moment motor terminal 38 is connected to terminal 36 over sliding contact 5, contact segment 4, sliding contact 8 and program contact 20. Motor 15 is started thereby and trip cam 32 closes automatic cut-out contact 33, 34 during one revolution of trip cam 32. Depending upon how contacts 33, 34, 35 are adjusted, the current to electro-magnetic coupling 12 through contacts 34, 35 is interrupted by lifting contact 34 from contact 35 either immediately or at the latest during the revolution of trip cam 32. In that way the power transmission from motor 11 to disc 3 is interrupted, and disc 3 is recoiled by spring 40 into the initial position shown. Then trip cam 32 completes one revolution and contacts 33, 34 open so as to stop motor 15. This is the cut-out self interruption of the step-switching programmer. Contacts 34, 35 are reclosed, coupling 12 re-energized and the pulse device 1 begins to run again in rotating disc 3 off its resting or initial position.

Contact 20 remains closed in the new position finally attained by switching disc 22 after completion of one step, and the pulse device 1 gives the next starting pulse to the automatic cut-out etc., after the same period of time has elapsed. This will be repeated until, in another position, contact 20 is opened by the trip cam of switching disc 22, and another contact, for example, contact 21 is closed. The pulse device 1 now sends a starting pulse to the automatic cut-out 2 only after contact segment 4 has reached sliding contact 9. The longer path of contact segment 4 corresponds to a longer time for this switching position. It can be clearly seen from the drawing that a shorter period of time or pulse duration is assigned to sliding contact 6 and a longer period of time or pulse duration to sliding contact 9. Pulse duration therefor is the time that disc 22 remains in a particular position until it is moved forward by another step, or, in other words every one of such steps is carried out after a period of time; called pulse duration, the length of which being determined by the selection of contacts 19, 20 and 21.

In the device as disclosed the pulse device i.e. disc 3 has returned to its initial or starting position before the step-movement of program disc 22 has been completed. In that way one can attain very short switching time intervals for the washing machine, and very quick steps in rapid sequence. The interdependence of returning the pulse device 1 and completing one step of stepper motor 15 always insures that any step is completed before a new time interval commences.

It is important, that the starting of drive motor 15 for the program contacts in the automatic cut-out circuit network 2 depends upon the path contact-segment 4 has travelled at a constant speed.

With a constant speed of disc 3, i.e. motor 11, the travelled distance of segment 4 is a measure of time and directly proportional thereto. The starting of the drive motor 15 for the stepping of the program contacts is a timed one.

Of course other ways of measuring time that lead to the starting of the drive motor 15 for the program contacts are conceivable.

It is essential only that the pulse sequence depends strictly on the time needed to bring the pulse device 1 (disc 3) from its initial position into contact with any of the selected sliding contacts 6 to 9. When a constantly running motor such as 11 is used for driving disc 3, it is also possible to have this motor provide for the drive for an auxiliary contact system simultaneously, e.g. to reverse the motor of the washing machine.

In order to predetermine the pulse durations as defined above, it is practical to have the pre-selection of the switching duration take place through the operating contacts 19, 20, 21, which are alternatingly closed. These contacts start the automatic cut-out via the corresponding sliding contact 7, 8 and 9, respectively.

The auxiliary contacts 28, 29, 30 are program contacts which assign various switching time intervals to particular switching positions of the washing machine during the program cycle thereof, they are operated by the stepwise moved motor 15.

One can therefore effect changes in the program simply by adding auxiliary contacts.

It is particularly advantageous to arrange other sliding contacts on the impulse device, that lie in the circuit of the electrical parts of the washing machine. Using this arrangement one can make sure that the corresponding parts of the washing machine are not connected to voltage during the stepping, that is that these parts will not be turned on for a short time, accidentally. This so-called blocking contact has particular importance when certain parts of the program consisting of a number of steps are to be by-passed quickly. This rapid by-passing can be effected by having the pre-selected program contacts bridge the pulse device and by having the motor in the automatic cut-out bridged for these switching positions.

A further advantage of this simple arrangement is that the sequence of the time intervals can be adjusted in shifting the relative position of sliding contacts 7, 8 and 9. One can easily adjust the times now, an advantage not to be had in the known arrangements.

A manually operated switch 41 makes it possible to connect sliding contact 6 to the automatic cut-out network 2 for a certain time independent of the program contacts. In that way one can have the switching disc 22 moved step-by-step until contact 41 opens again. Alternatively, switch 41 can be closed by thermostats or other parts, or it can be operated manually as stated in order to by-pass particular program sections during the stepping.

Switch 41 is especially needed when all operating program contacts 19, 20, 21, each corresponding to a particular pulse duration, are opened. In this case, motor 15 remains without current through automatic cut-out network 2 until switch 41 is closed.

Another possibility is depicted in FIG. 2. In this figure a contact blade 42 is permanently connected to a contact blade 34 and with terminal 36. That means that a maximum pulse period is assigned automatically to every position of switching disc 22. This measure is taken for security reasons, if one wants to make sure that, in case of a breakdown, the switching position of the switching disc does not retain that position unlimitedly. In other words, when all contacts 5, 6, 7 and 42 close this determines the longest time interval between the starting of the timer and the starting of stepping motor 15. In FIG. 2 parts having the same function as those in FIG. 1 are designated with like reference numerals. Contact 42, for example, if used in FIG. 1 could touch the periphery (circumference) of disc 3 at any place.

In FIG. 2 there is another arrangement of the contact system of the pulse device or timer. A conducting contact path which is set at the circumference of disc 3 is replaced by a cam disc 43 which is driven by motor 11 via intermediate gear wheels 44 and a gear wheel 45. Gear wheel 45 is affixed to a lever 46 having a pivot 47. The lever has a lug 49 on one end which slides on the circumference of a cam disc 48.

The arrangement operates in the following way. Gear wheel 45, connects drivingly gears 44 and disc 43 under the force of a spring 50 and this enables power transmission from motor 11 to cam disc 43. Cam disc 43 has a number of succeeding trip cams which are arranged at various radii 51, 52, 53 from rotation axis 54 of disc 43. When cam disc 43 is driven in the direction of arrow 55 the sliding lever 56, corresponding to radii 51-53 moves in the direction of arrow 57. Subsequently contacts 5 and 6 close, the contact 7 and later contact 42. This is the same sequence as was obtained when sliding contact blades 5, 6, 7, 8, 9 were reached by contact path 4 in FIG. 1.

The particular time interval elapsing from the starting of disc 43 to the closing of the starting circuit of motor 15 depends again on the open and closed position of contact switches 19 and 20.

When the automatic cut-out of motor 15 is started by one of contact blades 5, 6, 7 or 42 it causes not only the stepping of switching disc 22, but cam disc 48 presses lug 49 of the lever back thereby counter acting spring 50 and disengages gear wheel 45. In that way the power transmission from motor 11 to cam disc 43 is interrupted and disc 43 is recoiled by spring 40 into its initial or starting position, which is fixed by a stop 58.

The electro-magnetic coupling in FIG. 1 has been replaced in FIG. 2 by a mechanical coupling. The mechanical coupling, consisting of lever 46 and gear wheel 45 has the advantage that the stepping of cam disc 22 automatically causes the return of the pulse device or timer 1 to its initial or starting position, whereby a clear time sequence is determined in respect to the electrical contact making.

FIGURE 3 shows a modified arrangement of the pulse device. In this figure as in the others, parts having the same function are designated with the same numbers.

Similar to FIG. 1 sliding contacts are arranged around disc 3, which sends the starting pulse to terminal 38 of motor 15 for the program contacts. Another sliding contact 59 is added to these sliding contacts. It lies in the circuit of additional electrical control elements 60, 61 and 62 of the washing machine. These components or elements are connected to terminal 37 by program contacts 28, 29 or 30. The addition of sliding contact 59 ensures that the electrical control elements 60, 61 and 62 do not react immediately, even when program contacts 28, 29 or 30 are closed. Only after contact path 4 reaches the additional sliding contact 59, do the electrical elements receive current and begin to work, that is, these elements are actuated delayedly after a step has been completed and a new time interval is running. The real adavntage of this system lies in the fact that, these elements do not react at every step when a section is being run which contains a number of switching steps. Through this delayed action, those electrical elements are put into operation only after the sliding contact has reached its correct position, and has remained there for some time. In that way one may avoid the fluttering of relays, momentary switching impulses to water valves, and the like.

This invention can be used in all cases where one wants to use a pulse device and an automatic cut-out for the stepping of a switching disc, whereby all program variations are possible. Manual operation should be possible, that is, quick change, precise maintenance of all timed steps, and a versatility of all parts should be available, despite low production costs, limited space, and a great amount of precision.

I claim:

1. A program control system comprising a program disc, a switching mechanism including a cam, a timing mechanism for starting said switching mechanism at predetermined intervals, said switching mechanism moving said disc in a stepwise movement, a motor means releasably coupling the motor to the timing mechanism and said switching mechanism, cam disc means connected to the switching mechanism for disconnecting the drive to the timing mechanism.

2. The invention as defined in claim 1 wherein said releasable coupling comprises a two-armed lever having a releasable driving gear at one end and a feeler at the other end actuated by said cam of the switching mechanism.

3. A program control system comprising a timer device; an electric motor and control means for drivingly connecting said timer device to said motor; means for returning said timer device to its starting position when the connection between said motor and said timer device is interrupted; an electrical self-interrupting step switching device having a cam started in response to said timer device and respectively completing one step before being interrupted; and means operatively connected between said control means and said step switching device for interrupting the connection between said timer device and said motor after said step switching device has started, said step interrupting means comprising a lever having a releasable driving gear at one end and a feeler at the other end in contact with said cam of said switching device.

References Cited in the file of this patent
UNITED STATES PATENTS 2,599,234     Clark _____ June 3, 1952
3,046,421     Holzer _____ July 24, 1962